(12) United States Patent
Bazzica

(10) Patent No.: US 8,961,841 B2
(45) Date of Patent: Feb. 24, 2015

(54) PLASTIC FOAM MOLDING MACHINE MATERIAL CHANGE METHOD, AND MOLDING MACHINE IMPLEMENTING SUCH A METHOD

(75) Inventor: Carlo Bazzica, Matigge di Trevi-Foligno (IT)

(73) Assignee: Bazzica Engineering S.R.L., Trevi (IT)

( * ) Notice: Subject to any disclaimer, the term of this patent is extended or adjusted under 35 U.S.C. 154(b) by 983 days.

(21) Appl. No.: 13/122,899

(22) PCT Filed: Oct. 5, 2009

(86) PCT No.: PCT/IB2009/007046
§ 371 (c)(1),
(2), (4) Date: Jul. 28, 2011

(87) PCT Pub. No.: WO2010/041116
PCT Pub. Date: Apr. 15, 2010

(65) Prior Publication Data
US 2011/0285045 A1 Nov. 24, 2011

(30) Foreign Application Priority Data
Oct. 6, 2008 (IT) .............................. TO2008A0731

(51) Int. Cl.
| B29C 45/04 | (2006.01) |
| B08B 9/08 | (2006.01) |
| B08B 9/032 | (2006.01) |
| B29C 33/72 | (2006.01) |
| B29C 44/44 | (2006.01) |
| B29C 45/17 | (2006.01) |
| B29C 47/00 | (2006.01) |
| B29C 37/00 | (2006.01) |

(52) U.S. Cl.
CPC ................. *B08B 9/08* (2013.01); *B08B 9/0328* (2013.01); *B29C 33/72* (2013.01); *B29C 44/445* (2013.01); *B29C 45/1753* (2013.01); *B29C 47/0019* (2013.01); *B29C 37/0096* (2013.01); *B29K 2995/002* (2013.01); *B29C 47/0004* (2013.01)
USPC .......................................... 264/39; 264/169

(58) Field of Classification Search
CPC ............ B29C 47/10; B08B 5/00; B08B 5/02; B08B 5/04
USPC ..................................................... 264/39, 169
See application file for complete search history.

(56) References Cited

U.S. PATENT DOCUMENTS 4,185,060 A * 1/1980 Ladney, Jr. ...................... 264/54
5,961,734 A 10/1999 Kight et al.

FOREIGN PATENT DOCUMENTS

| DE | 3900664 A1 | 7/1990 |
| DE | 102004016756 A1 | 11/2005 |
| WO | WO-2004/103522 A | 12/2004 |

OTHER PUBLICATIONS

Roth U, DE 3900664 A1, Derwent Abstract, Jul. 1990.*
(Continued)

*Primary Examiner* — Galen Hauth
(74) *Attorney, Agent, or Firm* — Venable LLP; Robert Kinberg

(57) ABSTRACT

In a machine for molding colored plastic foam material, a cleaning cycle is performed, before changing color, to clean a feed circuit having a reservoir and interposed, in the machine, between a storage bin and a mold; the cleaning cycle including: emptying the reservoir by suction to remove any material still inside the reservoir; injecting compressed air into the feed circuit so that any material remaining along the feed circuit is at least partly expelled from the feed circuit and at least partly fed into a header located at the bottom of the reservoir; and emptying the header by suction.

11 Claims, 6 Drawing Sheets

(56) References Cited

OTHER PUBLICATIONS

Konermann et al., DE 102004016756 A1, Derwent Abstract, Nov. 2005.*
Konermann et al., DE 102004016756 A1, Machine Translation, Nov. 2005.*

International Search Report and Written Opinion of the Searching Authority of PCT/IB2009/007046 Mailed Feb. 16, 2010.
International Preliminary Report on Patentability Dated Decemer 15, 2010.

* cited by examiner

PLASTIC FOAM MOLDING MACHINE MATERIAL CHANGE METHOD, AND MOLDING MACHINE IMPLEMENTING SUCH A METHOD

CROSS REFERENCE TO RELATED APPLICATION

The present application is a U.S. National Stage of International Application No. PCT/IB2009/007046, filed Oct. 5, 2009, designating the United States and claiming priority to Italian Application No. TO2008A000731, filed Oct. 6, 2008.

TECHNICAL FIELD

The present invention relates to a plastic foam molding machine material change method, and to a molding machine implementing such a method.

In the following description, the term "material change" is intended to mean changing a first material in a molding machine with a second material different from the first. More specifically, the second material may either differ completely from the first, or have the same composition as the first but differ as to one or more characteristics, such as weight and/or density and/or simply colour.

Purely by way of a non-limiting example, the following description refers to the most common case of changing, in a molding machine, a first coloured plastic foam material—normally a polymer foam, such as polypropylene, polyethylene, polystyrene, to which the following description refers purely by way of example—with a similar foam material of different colour.

BACKGROUND ART

In known molding machines, the plastic material is fed into a mold by a feed circuit connected to a bin storing plastic material in the form of pre-expanded granules of a given colour. The feed circuit normally comprises at least one reservoir, in which a batch of material drawn from the bin is maintained at a given pressure; and at least one, normally pneumatic, loader connected to the reservoir by a header to receive a quantity of material from the reservoir and feed it directly into the mold.

A change in product colour involves emptying the feed circuit, in particular the reservoir, of the previous batch of a first material; cleaning the feed circuit; and loading the reservoir with a batch of a different-coloured second material.

As described, for example, in DE 102004016756, the feed circuit is still normally cleaned by successively aspirating the first material from the reservoir and then from various points of the feed circuit downstream from the reservoir, to clear the machine of the first material batch.

This method has serious drawbacks, mainly due to the tendency of the pre-expanded granular material to charge electrostatically and adhere to the inside of the reservoir and the feed circuit conduits, so that successive suction cleaning fails to ensure all the material is removed. As a result, when the machine is turned on again, any granules of the previous colour left inside the feed circuit contaminate the colour the initial output of the machine, which must therefore be rejected.

The above considerations apply to DE-3900664, U.S. Pat. No. 5,961,734 and WO-2004/103522.

SUMMARY

It is an object of the present invention to provide a material change method for a coloured plastic foam molding machine, which is cheap and easy to implement and designed to eliminate the above drawbacks.

According to the present invention, there is provided, in one embodiment, a method of changing material in a plastic foam molding machine, comprising: a cleaning cycle to remove a first batch of a first material from a feed circuit interposed, in the machine, between a storage bin and a mold, before replacing the first batch with a second batch of a second material different from the first; the cleaning cycle comprising: a first step of emptying a reservoir of the feed circuit by suction to remove any material of the first batch still inside the reservoir; the method being characterized by further comprising: a second step of pushing any material of the first batch remaining along the feed circuit at least in part outside the feed circuit and at least in part into a header located at the bottom of the reservoir by injecting compressed air into the feed circuit, the header having at least one transverse ejector associated with a respective outlet end loader of the feed circuit; and a third step of emptying the header by suction.

BRIEF DESCRIPTION OF THE DRAWINGS

A non-limiting embodiment of the present invention will be described by way of example with reference to the accompanying drawings, in which.

DETAILED DESCRIPTION

Figure 1:
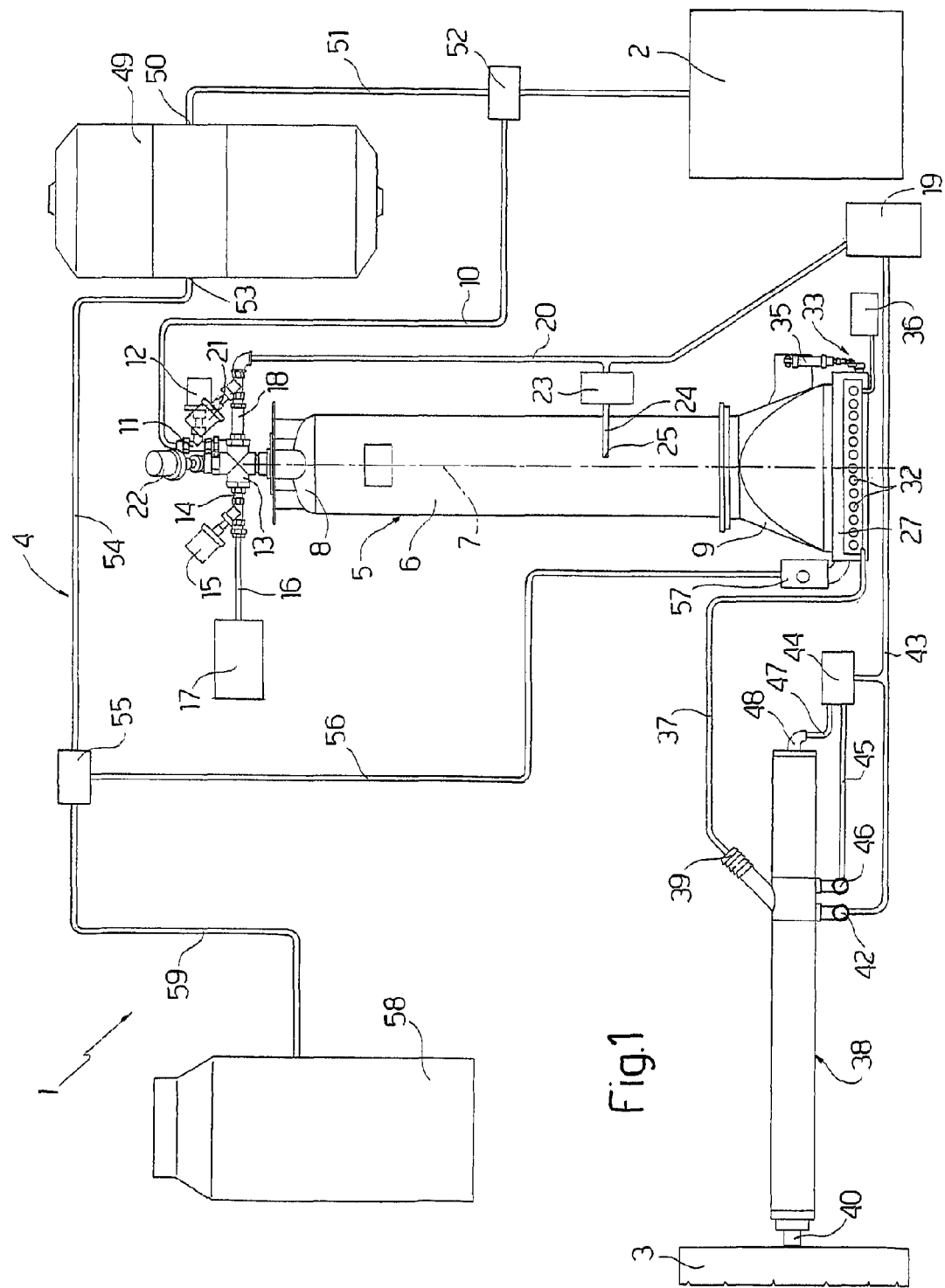
FIG. 1 shows a schematic, partial block diagram of a preferred embodiment of the machine according to the present invention.

Number 1 in FIG. 1 indicates as a whole a machine for molding coloured plastic foam material, such as polypropylene, polyethylene, polystyrene and their copolymers.

Machine 1 comprises a bin 2 for storing plastic material in the form of pre-expanded granules of given colour; a known mold 3 (therefore not described); and a feed circuit 4 interposed between bin 2 and mold 3 to feed measured amounts of plastic material into mold 3.

Figure 2:
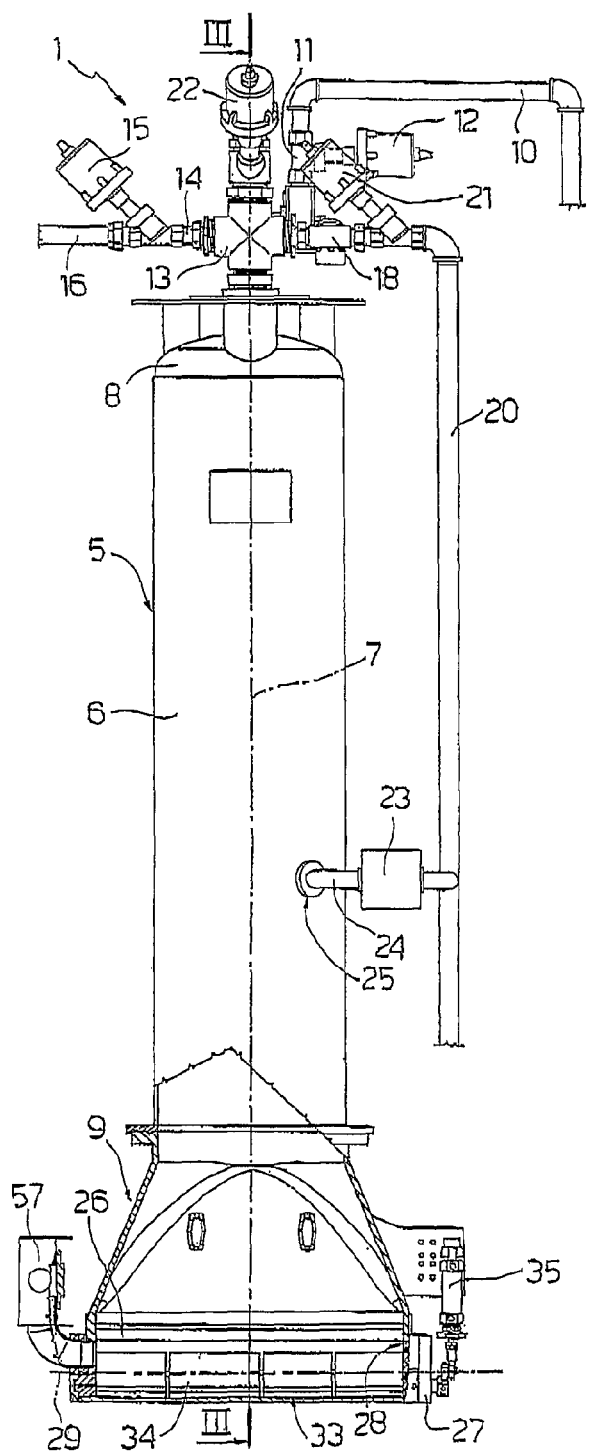
FIG. 2 shows a larger-scale, partly sectioned front view of a detail of the FIG. 1 machine.
Figure 3:
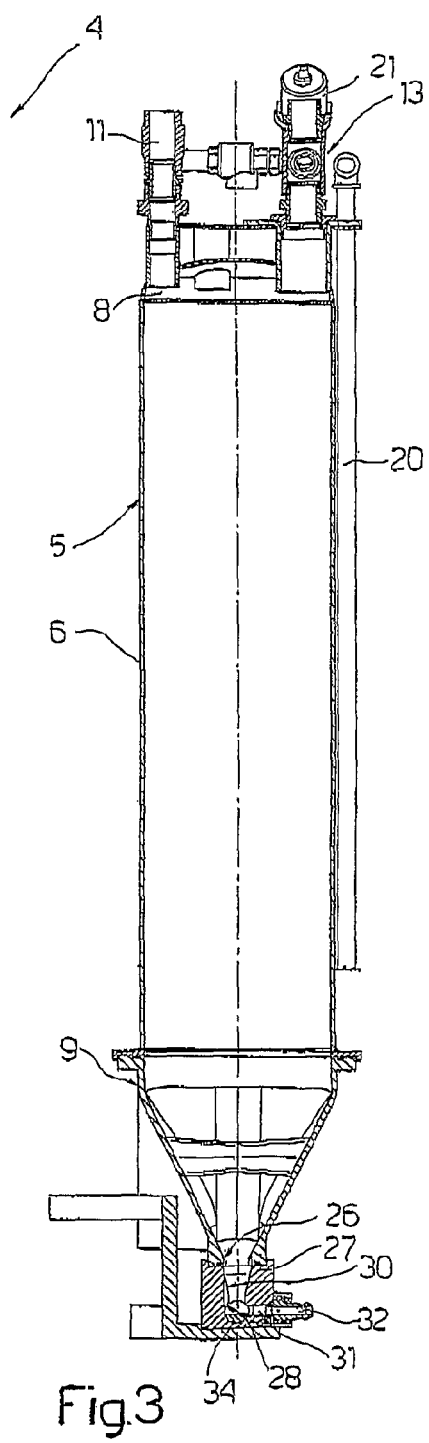
FIG. 3 shows a section along line III-III in FIG. 2.
Figure 4:
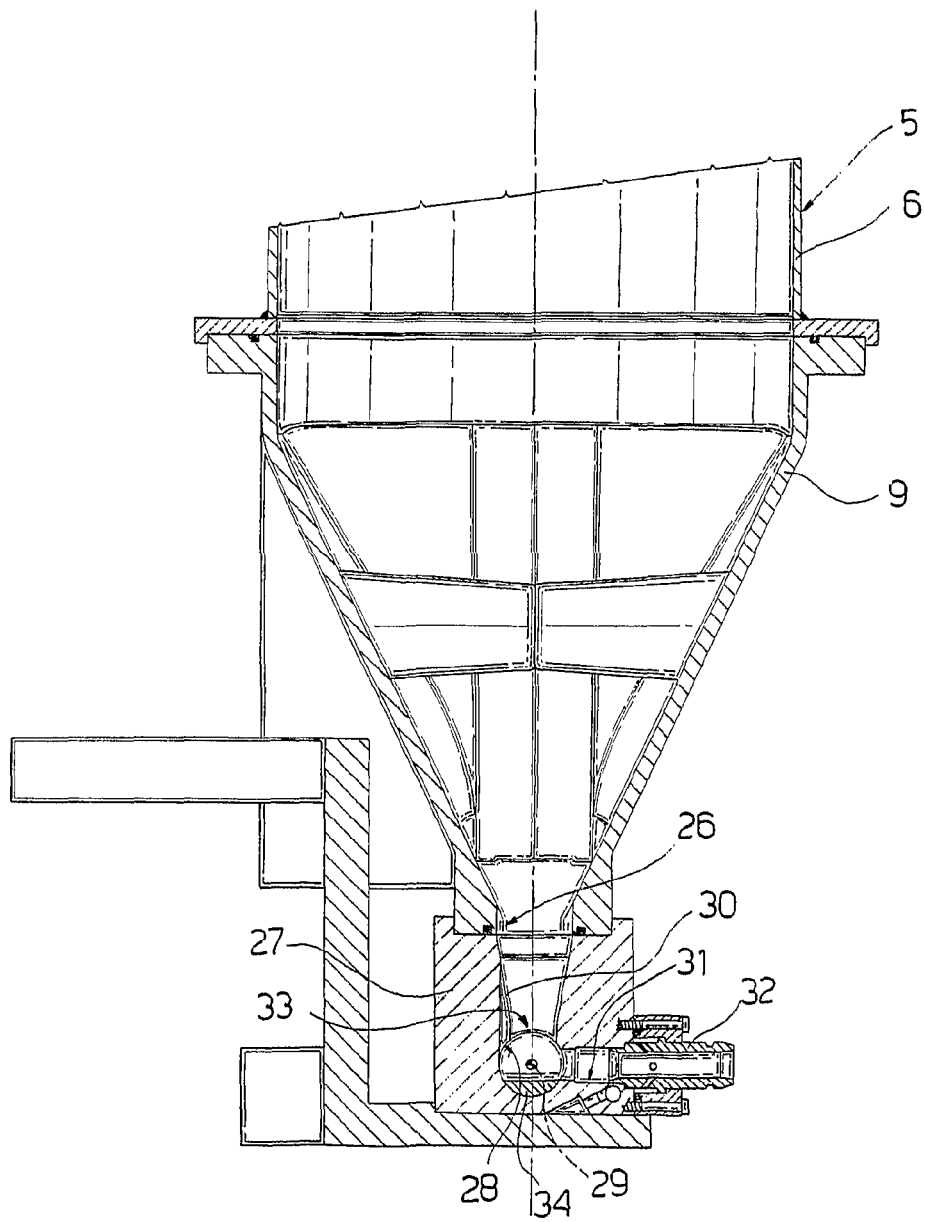
FIG. 4 shows a larger-scale detail of FIG. 3.
Figure 5:
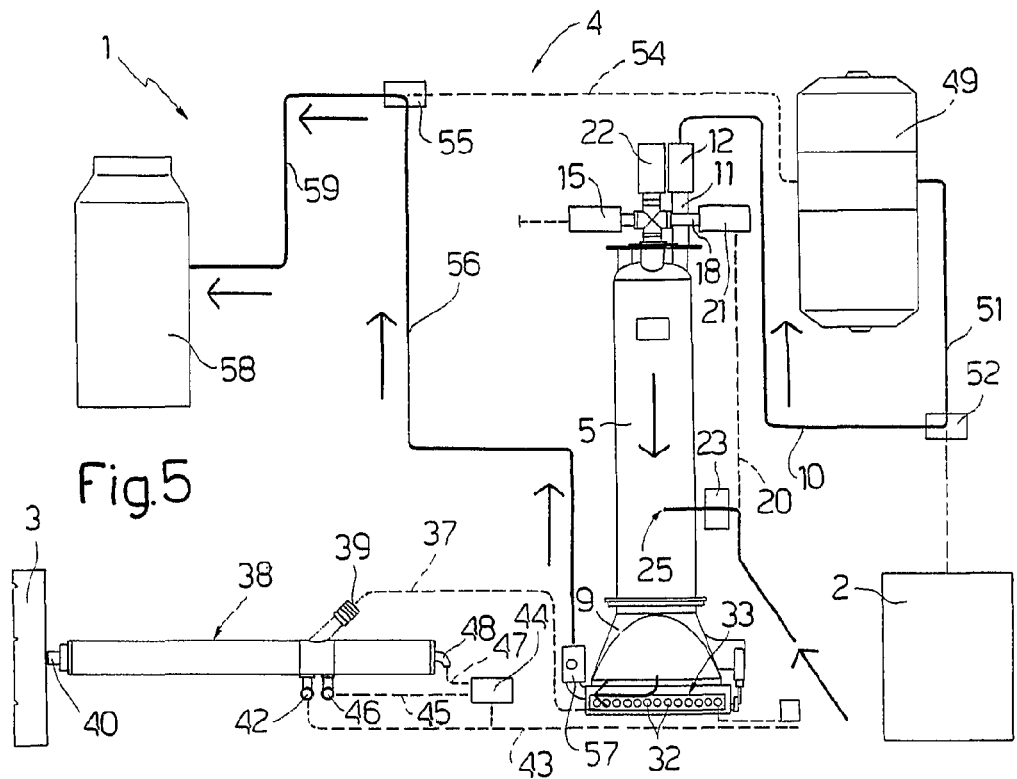
FIGS. 5 to 10 show schematic block diagrams of the FIG. 1 machine in different operating configurations.
Figure 6:
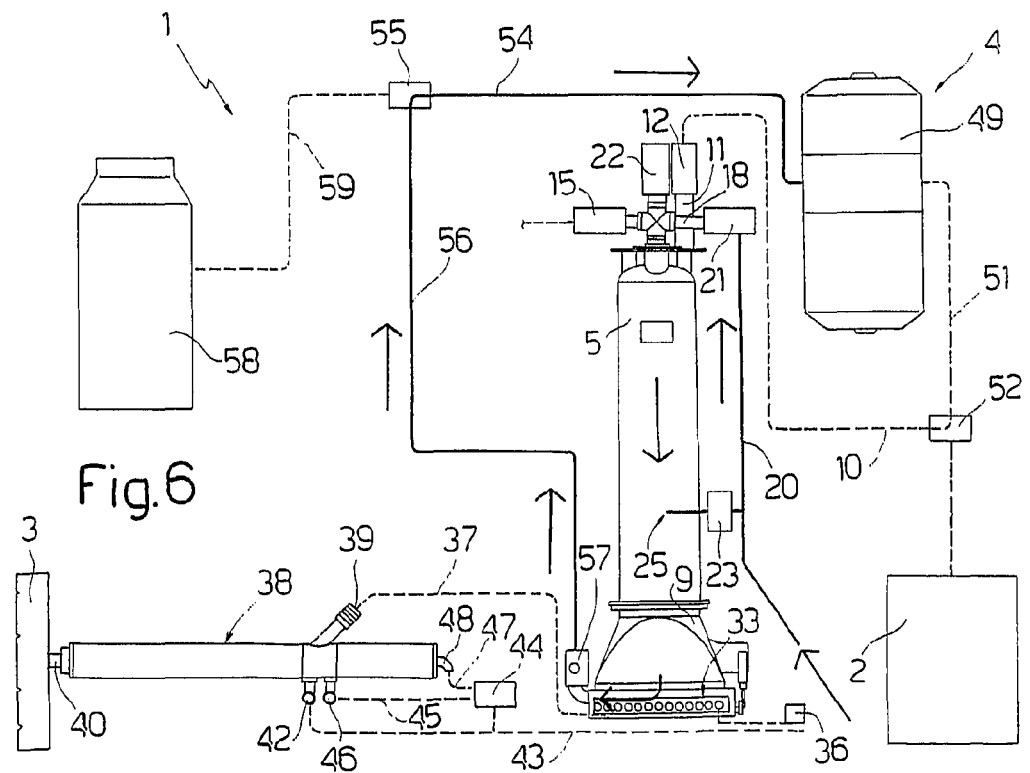
Figure 7:
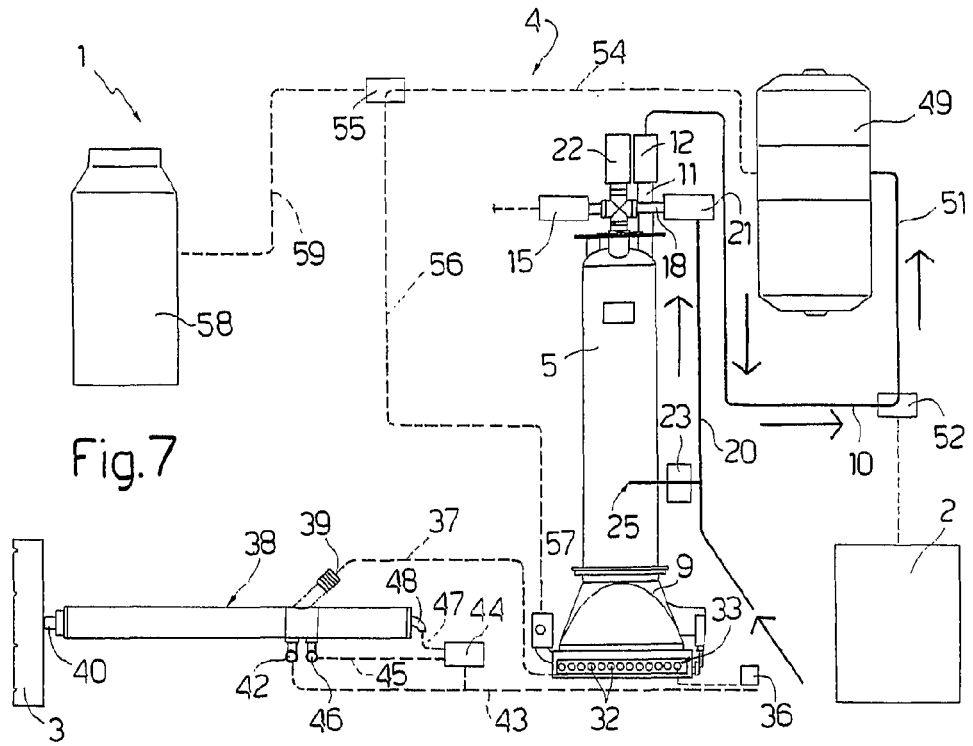
Figure 8:
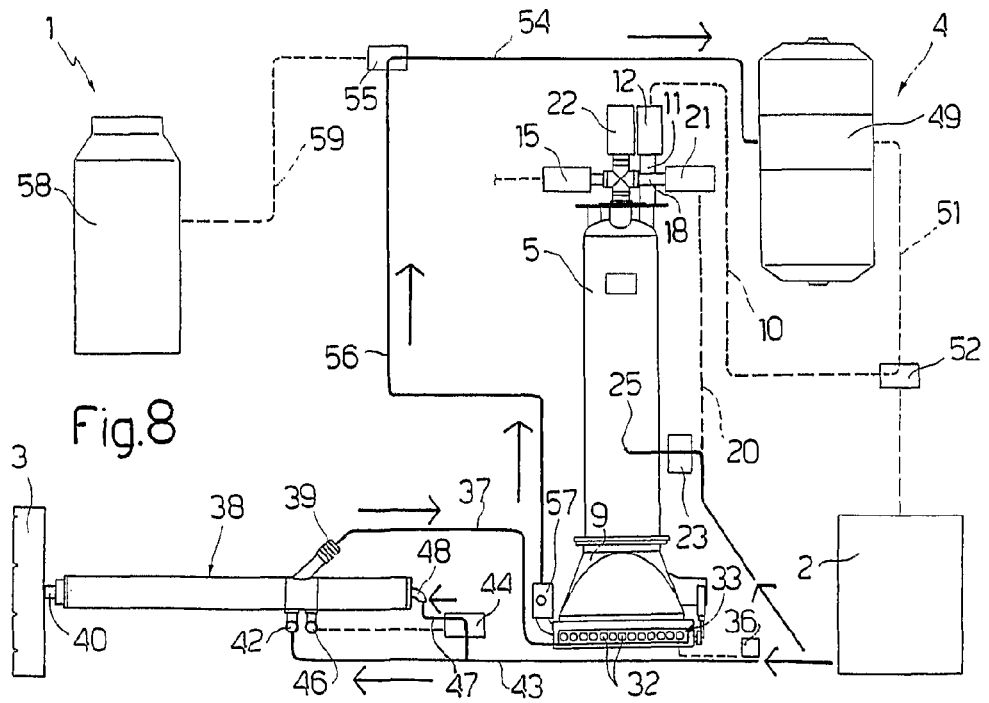
Figure 9:
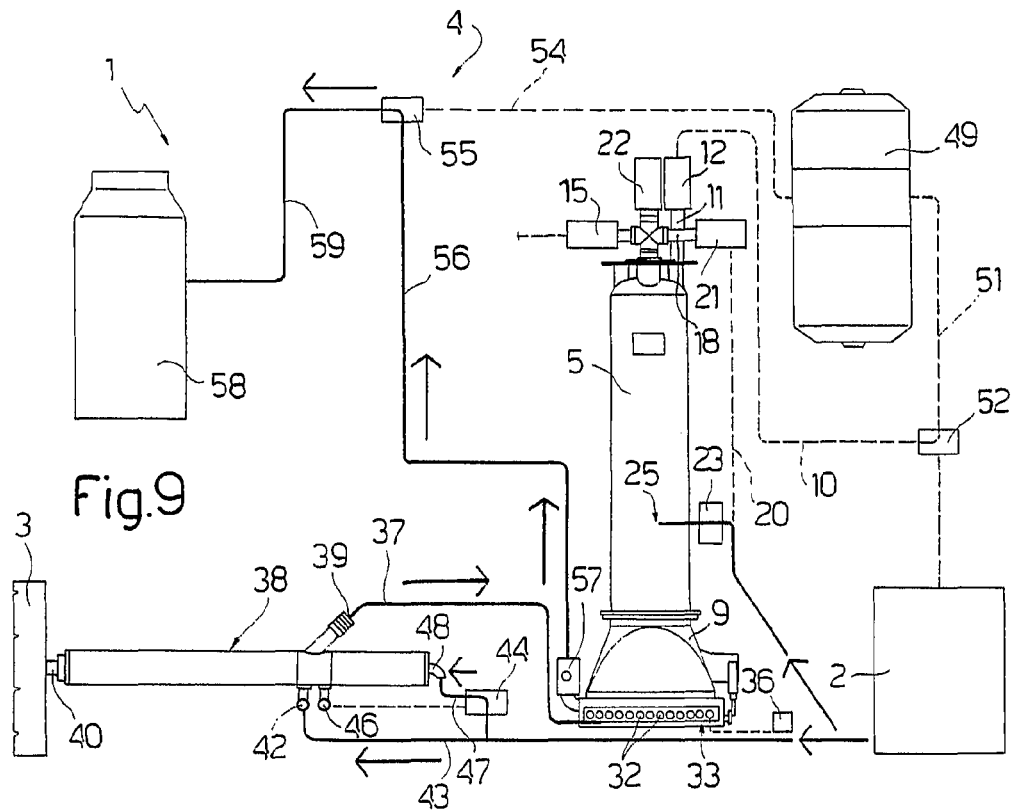
Figure 10:
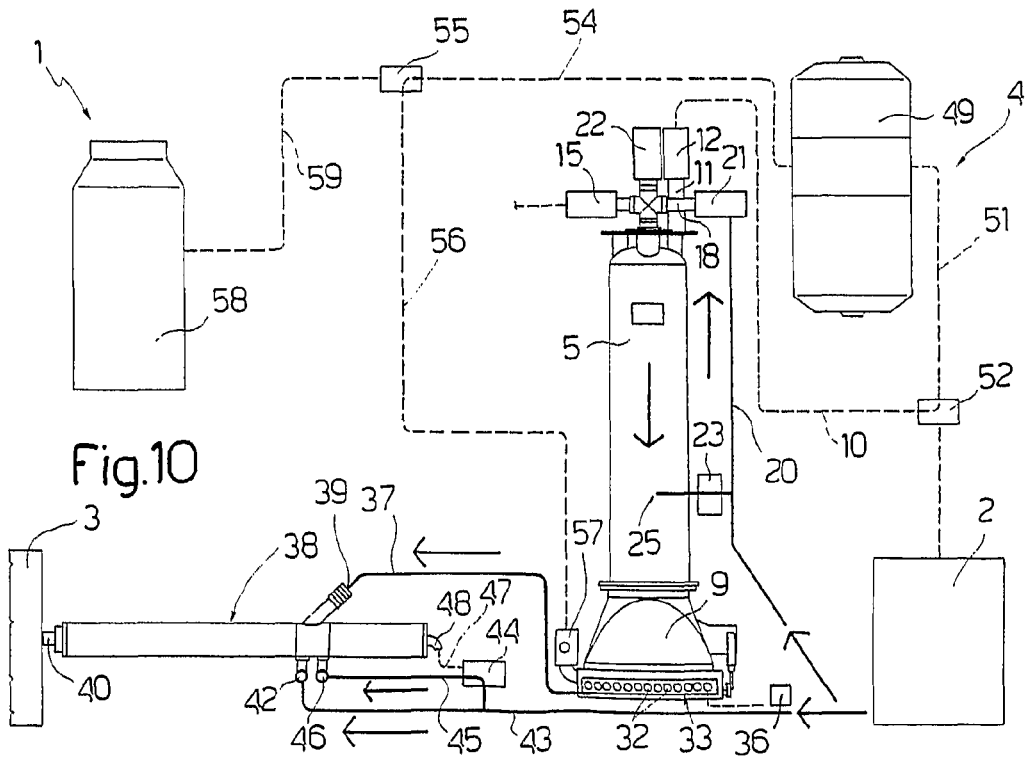

More specifically, as shown in FIGS. 1, 2 and 3, feed circuit 4 comprises a loading reservoir 5 defined by a hollow body 6 coaxial with a longitudinal axis 7 and closed at the top by a lid 8, and at the bottom by a hopper 9. Reservoir 5 is connected to bin 2 by a feed pipe 10, the outlet end of which is connected to an inlet 11 on lid 8 by a valve 12 for enabling or disabling material flow to reservoir 5. Reservoir 5 is also connected to a three-inlet fitting 13 fitted to lid 8 and comprising a suction inlet 14 connected by a valve 15 and a pipe 16 to a suction pump 17, which is activated, when loading reservoir 5, to create a vacuum inside reservoir 5 and so draw a batch of material into reservoir 5 along pipe 10 and through the open valve 12.

Facing inlet 14, fitting 13 comprises an inlet 18 for compressed air, which is fed along a feed pipe 20 to reservoir 5 by a compressor 19 to bring reservoir 5, already loaded with a batch of material, to a given operating pressure. Compressed-air flow into reservoir 5 is regulated by a valve 21 upstream from inlet 18 and close to the outlet end of pipe 20.

Between inlets 14 and 18, fitting 13 comprises a third inlet connected to a relief valve 22 for discharging the pressure inside reservoir 5.

An intermediate portion of compressed-air feed pipe 20 to reservoir 5 has a branch pipe connected, via an open/close valve 23, to a number of branches 24 (only one shown in FIG. 1 for the sake of simplicity) for feeding compressed air into reservoir 5 through respective inlets 25, which are formed in a lateral wall of body 6, are equally spaced about axis 7, and are located in a plane crosswise to axis 7 and a given distance from hopper 9.

In a variation not shown, pipe 20 has two or more superimposed branch pipes with respective numbers of inlets 25 located in respective planes crosswise to and superimposed along axis 7.

As shown in FIGS. 1 to 4, hopper 9 is funnel-shaped, tapering downwards, with a substantially rectangular outlet 26, and a substantially circular inlet connected smoothly to the bottom end of body 6. Hopper 9 is closed at the bottom by a block 27 housing a substantially cylindrical header 28, which is coaxial with an axis 29 perpendicular to axis 7, communicates with outlet 26 of hopper 9 through an opening 30 parallel to axis 29, and has a number of lateral outlets 31, each communicating directly with the inlet of a respective ejector 32 of a group of ejectors 32 carried by block 27 and aligned side by side in a direction parallel to axis 29.

Header 28 is controlled by a valve 33 comprising a shutter 34 housed in header 28 and rotating about axis 29; and a pneumatic actuator 35 (FIG. 2) fitted to hopper 9 and for moving shutter 34 between an open position (FIG. 4) allowing material to flow freely to ejectors 32 through opening 30, header 28, and outlets 31, and a closed position in which shutter 34 closes outlets 31 to cut off material flow from header 28 to ejectors 32.

As shown in FIGS. 1 to 4, ejectors 32 are pneumatic, and each have inlets for compressed air, which is injected under the control of a valve 36 and intermittently with a given frequency to "lubricate" material flow through ejectors 32.

Each ejector 32 is connected by a respective material feed pipe 37 to a respective loader 38 (only one loader 38 shown in the drawings for the sake of simplicity) defined by a tubular body, which, close to its rear end, has an inlet 39 connected to material feed pipe 37, and, at its front end, has a nozzle 40 for feeding the incoming material from reservoir 5 directly into mold 3.

Loader 38 also comprises a first compressed-air inlet 42 connected by a feed pipe 43 to compressor 19. An intermediate portion of pipe 43 has a branch pipe fitted with a switch valve 44 connected by a pipe 45 to a second compressed-air inlet 46 close to inlet 42, and by a pipe 47 to a third compressed-air inlet 48 located at the rear end of loader 38 and communicating with the end of a piston (not shown), which is housed inside loader 38 and slid, by the compressed air through inlet 48, between a withdrawn position opening nozzle 40, and a forward position closing nozzle 40.

Feed circuit 4 also comprises a two-inlet cyclone separator 49, a first inlet 50 of which is connected by a pipe 51 to a two-way valve 52 fitted to material feed pipe 10 to selectively connect reservoir 5 to bin 2 by pipe 10, and to cyclone separator 49 by pipe 51 and an end portion of pipe 10.

A second inlet 53 of cyclone separator 49 is connected by a pipe 54 to a first outlet of a two-way valve 55 for connecting pipe 54 to a pipe 56 and, via an open/close valve 57, to an axial end of header 28.

Feed circuit 4 also comprises an aspirator 58 connected by a pipe 59 to a second outlet of valve 55 to communicate, via pipe 56 and valve 57, with header 28.

Operation of machine 1 will now be described with reference to FIGS. 5 to 10, which show a cleaning cycle to which machine 1 is subjected after performing a given number of operating cycles (in known manner) using material of a given colour, and after being stopped to make a colour change.

The cleaning cycle comprises a first subcycle comprising five steps; and a second subcycle comprising an end step hereinafter referred to as STEP 6.

In a preferred embodiment, the first subcycle is repeated two or more times before performing the second subcycle.

For the sake of clarity, in FIGS. 5 to 10, the "active" portions of feed circuit 4 and the relative travelling directions are indicated, for each step, by continuous lines and directional arrows.

STEP 1 (FIG. 5): Suction of the batch of material in reservoir 5.

At this step, valve 12 is opened intermittently; valve 52 is set to connect cyclone separator 49 to reservoir 5 by pipes 51 and 10; valve 23 is opened intermittently; and, finally, valve 33 is closed, valve 57 is opened, and valve 55 is set to connect header 28 to aspirator 58. Once aspirator 58 is activated, the batch of material in reservoir 5 is sucked into aspirator 58 via header 28 and pipes 56 and 59. At the same time, compressor 19 (FIG. 1) is activated, and the compressed-air jets blown into reservoir 5 through inlets 25 create an airflow to assist expulsion of the material from reservoir 5, and, in particular, dislodge into header 28 at least some of the granules of material which, charged electrostatically, would adhere to the inner wall of reservoir 5; and the open valve 12 allows airflow from cyclone separator 49 into reservoir 5 to prevent formation of a vacuum inside reservoir 5.

STEP 2 (FIG. 6): Compressed-air injection to remove residue from reservoir 5.

At this step, valve 12 is closed to isolate reservoir 5 from cyclone separator 49; valve 23 is kept open intermittently, and valve 21 is opened intermittently to also allow compressed air into reservoir 5 through inlet 18 as well as inlets 25; valve 33 is kept closed, valve 57 is kept open, and valve 55 is set to connect header 28 to cyclone separator 49 by pipes 56 and 54.

Airflow is thus created through reservoir 5, along header 28, and into cyclone separator 49, and which takes with it any granules of material remaining inside reservoir 5 and header 28.

STEP 3 (FIG. 7): compressed-air injection to remove residue from the portion of feed circuit 4 feeding material to reservoir 5.

At this step, valve 33 is kept closed; valve 57 is closed; valves 23 and 21 are kept open intermittently, and valve 12 is opened; and valve 52 is set to connect reservoir 5 to cyclone separator 49 by pipes 10 and 51.

Airflow is thus created through reservoir 5, out of reservoir 5 through material inlet 11, along pipes 10 and 51, and into cyclone separator 49, taking with it any granules still left inside reservoir 5 and pipe 10.

STEP 4 (FIG. 8): compressed-air injection to remove residue from the portion of feed circuit 4 feeding material to loaders 38.

At this step, valves 12 and 21 are closed; valve 57 is opened; valve 55 is set to connect header 28 to cyclone separator 49; valve 33 is opened to also connect header 28 to loaders 38 by respective ejectors 32 and pipes 37; and valves 44 are set so that, for each loader 38, compressed air fed along pipe 43 flows into loader 38 through inlet 42, and compressed air fed along pipe 47 flows into loader 38 through inlet 48 to move the piston (not shown) into the forward position closing nozzle 40.

For each loader 38, operation of compressor 19 (FIG. 1) thus creates airflow through loader 38 via inlets 42 and 39, along respective pipe 37, and through respective ejector 32 into header 28, where it joins with the airflow fed through inlets 25 into reservoir 5, and flows out along pipes 56 and 54 into cyclone separator 49.

Any granules left on the material feed portions of loaders 38, pipes 37, and ejectors 32 are thus removed.

STEP 5 (FIG. 9): suction to remove residue from the portion of feed circuit 4 feeding material to loaders 38.

This step differs from step 4 by setting valve 55 to connect header 28 to aspirator 58 as opposed to cyclone separator 49, so that the blow-off airflow produced by compressor 19 (FIG. 1) along pipes 20 and 43 flows along part of reservoir 5, loaders 38, pipes 37, and ejectors 32 into header 28, and is sucked out by aspirator 58.

This step provides for removing from feed circuit 4 any remaining granules fed into header 28 at STEPS 1 to 4 described above.

STEP 6 (FIG. 10): "no-load" air run of loaders 38.

At this step, operation of loaders 38 is simulated by feeding them with air, which is fed through inlets 25 and, after first opening valve 21, through inlet 18 into reservoir 5, and flows into loaders 38 through left-open valve 33, header 28, ejectors 32 and respective pipes 37, following the same path as the actual material. Valve 36 for feeding air through ejectors 32 is opened intermittently, and valves 44 are set so that, for each loader 38, compressed air flows along pipes 43 and 45; and cut-off of air supply to inlet 48 moves the piston (not shown) back to the withdrawn position opening nozzle 40.

The compressed air injected into loader 38 through inlets 42 and 46 creates a venturi effect inside loader 38, which expels the air "batch" through nozzle 40, thus removing any granules from the front area of loader 38 close to nozzle 40.

In a variation not shown, the cleaning cycle comprises a further step (not shown) before or simultaneously with STEP 4 described above.

The further step comprises blowing an antistatic product into reservoir 5, together with the air fed through inlets 25, to counteract the tendency of the granules to adhere to the inner wall of reservoir 5, and so assist dislodging the granules into header 28.

The invention claimed is:

1. A method of changing material in a plastic foam molding machine, the method comprising a cleaning cycle to remove a first batch of a first material from a feed circuit interposed, in the machine, between a storage bin and a mold, before replacing the first batch with a second batch of a second material different from the first; the cleaning cycle comprising:
   a first step of emptying a reservoir of the feed circuit by suction to remove any material of the first batch still inside the reservoir;
   the method further comprising:
   a second step of pushing any material of the first batch remaining along the feed circuit at least in part outside the feed circuit and at least in part into a header located at the bottom of the reservoir by injecting compressed air into the feed circuit, the header having at least one transverse ejector associated with a respective outlet end loader of the feed circuit;
   a third step of emptying the header by suction; and
   after the third step, performing a no-load feed cycle, so that any material of the first batch still inside the feed circuit is blown out from an outlet of the loader.

2. A method as claimed in claim 1, wherein the second step comprises a first substep of injecting compressed air into the reservoir; and expelling the compressed air from the reservoir through an axial outlet of the header by closing valve means controlling communication between the header and the ejector.

3. A method of changing material in a plastic foam molding machine, the method comprising a cleaning cycle to remove a first batch of a first material from a feed circuit interposed, in the machine, between a storage bin and a mold, before replacing the first batch with a second batch of a second material different from the first; the cleaning cycle comprising:
   a first step of emptying a reservoir of the feed circuit by suction to remove any material of the first batch still inside the reservoir;
   the method further comprising:
   a second step of pushing any material of the first batch remaining along the feed circuit at least in part outside the feed circuit and at least in part into a header located at the bottom of the reservoir by injecting compressed air into the feed circuit, the header having at least one transverse ejector associated with a respective outlet end loader of the feed circuit, wherein the second step comprises a first substep of injecting compressed air into the reservoir; and expelling the compressed air from the reservoir through an axial outlet of the header by closing valve means controlling communication between the header and the ejector; and a second substep of injecting compressed air into the reservoir; and expelling the compressed air from the reservoir along a material feed pipe to the reservoir, by maintaining the valve means controlling communication between the header and the ejector in a closed position; and
   a third step of emptying the header by suction.

4. A method of changing material in a plastic foam molding machine, the method comprising a cleaning cycle to remove a first batch of a first material from a feed circuit interposed, in the machine, between a storage bin and a mold, before replacing the first batch with a second batch of a second material different from the first; the cleaning cycle comprising:
   a first step of emptying a reservoir of the feed circuit by suction to remove any material of the first batch still inside the reservoir;
   the method further comprising:
   a second step of pushing any material of the first batch remaining along the feed circuit at least in part outside the feed circuit and at least in part into a header located at the bottom of the reservoir by injecting compressed air into the feed circuit, the header having at least one transverse ejector associated with a respective outlet end loader of the feed circuit, wherein the second step comprises a first substep of injecting compressed air into the reservoir; and expelling the compressed air from the reservoir through an axial outlet of the header by closing valve means controlling communication between the header and the ejector, wherein compressed air is fed to the reservoir partly through a compressed-air inlet of the reservoir, and partly through a number of intermediate lateral inlets of the reservoir; and
   a third step of emptying the header by suction.

5. A method of changing material in a plastic foam molding machine, the method comprising a cleaning cycle to remove a first batch of a first material from feed circuit interposed, in the machine, between a storage bin and a mold, before replacing the first batch with a second batch of a second material different from the first; the cleaning cycle comprising:
- a first step of emptying a reservoir of the feed circuit by suction to remove any material of the first batch still inside the reservoir;
- the method further comprising:
- a second step of pushing any material of the first batch remaining along the feed circuit at least in part outside the feed circuit and at least in part into a header located at the bottom of the reservoir by injecting compressed air into the feed circuit, the header having at least one transverse ejector associated with a respective outlet end loader of the feed circuit, wherein the second step comprises a first substep of injecting compressed air into the reservoir; and expelling the compressed air from the reservoir through an axial outlet of the header by closing valve means controlling communication between the header and the ejector and a further substep of injecting compressed air into the reservoir both directly, and indirectly through the loader and relative ejector, after first opening the valve means controlling communication between the header and the ejector; and expelling the compressed air from the reservoir through the axial outlet of the header; and
- a third step of emptying the header by suction.

6. A method as claimed in claim 5, wherein compressed air is fed directly to the reservoir through a number of intermediate lateral inlets of the reservoir.

7. A method of changing material in a plastic foam molding machine, the method comprising a cleaning cycle to remove a first batch of a first material form a feed circuit interposed, in the machine, between a storage bin and a mold, before replacing the first batch with a second batch of a second material different from the first; the cleaning cycle comprising:
- a first step of emptying a reservoir of the feed circuit to remove any material of the first batch still inside the reservoir;
- the method further comprising:
- a second step of pushing any material of the first batch remaining along the feed circuit at least in part the feed circuit and at least in art into a header located at the bottom of the reservoir by injecting compressed air into the feed circuit, the header having at least one transverse ejector associated with a respective outlet end loader of the feed circuit, wherein the second step corn rises a first substep of injecting compressed air into the reservoir; and expelling the compressed air from the reservoir through an axial outlet of the header by closing valve means controlling communication between the header and the ejector, wherein, in the course of the second step, compressed air is fed intermittently to the reservoir; and
- a third step of emptying the header by suction.

8. The method as claimed in claim 1, wherein, in the course of the first and third step, the material is sucked out by an aspirator through an axial outlet of the header.

9. A method of changing material in a plastic foam molding machine, the method comprising a cleaning cycle to remove a first batch of a first material from a feed circuit interposed, in the machine, between a storage bin and a mold, before replacing the first batch with a second batch of a second material different from the first; the cleaning cycle comprising:
- a first step of emptying a reservoir of the feed circuit by suction to remove any material of the first batch still inside the reservoir;
- the method further comprising:
- a second step of pushing any material of the first batch remaining along the feed circuit at least in part outside the feed circuit and at least in part into a header located at the bottom of the reservoir by injecting compressed air into the feed circuit, the header having at least one transverse ejector associated with a respective outlet end loader of the feed circuit, wherein, in the course of the second step, the compressed air fed into the feed circuit is expelled through a cyclone separator; and
- a third step of emptying the header by suction.

10. A method as claimed in claim 1, wherein, in the course of the first step, compressed air is fed to the reservoir through a number of intermediate lateral inlets of the reservoir.

11. A method of changing material in a plastic foam molding machine, the method comprising a cleaning cycle to remove a first batch of a first material from a feed circuit interposed, in the machine, between a storage bin and a mold, before replacing the first batch with a second batch of a second material different from the first; the cleaning cycle comprising:
- a first step of emptying a reservoir of the feed circuit by suction to remove any material of the first batch still inside the reservoir;
- the method further comprising:
- a second step of pushing any material of the first batch remaining along the feed circuit at least in art outside the feed circuit and at least in at into a header located at the bottom of the reservoir by injecting compressed air into the feed circuit, the header having at least one transverse ejector associated with a respective outlet end loader of the feed circuit; and
- a third step of emptying the header by suction, wherein, in the course of the third step, compressed air is fed to the reservoir both directly through a number of intermediate lateral inlets of the reservoir, and indirectly through the loader and the relative ejector, after first opening a valve means controlling communication between the header and the ejector.

* * * * *